Patented June 5, 1945

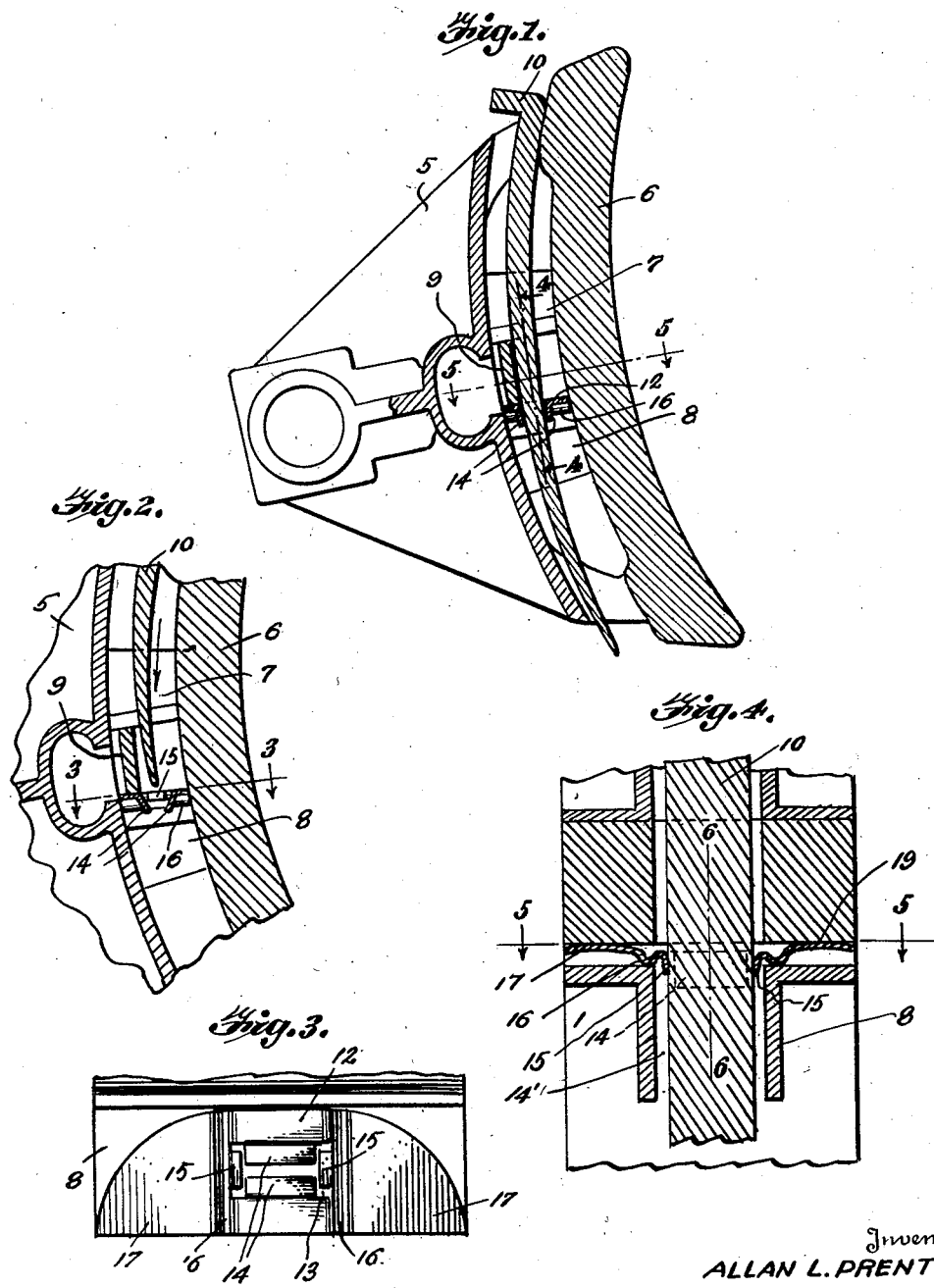

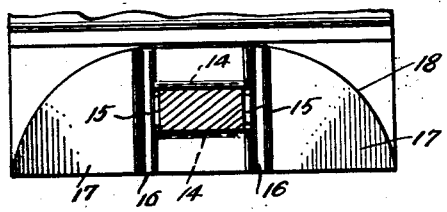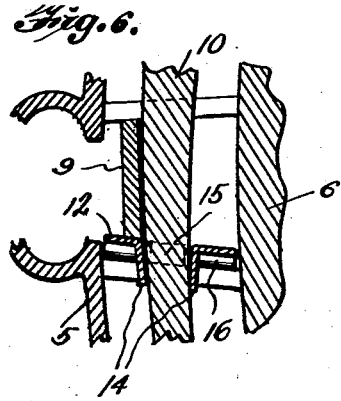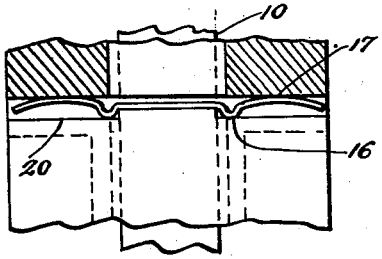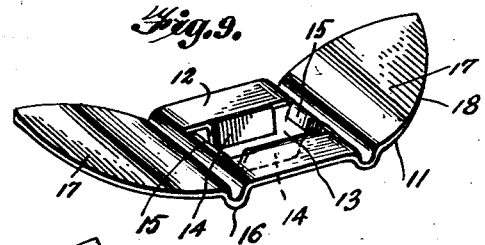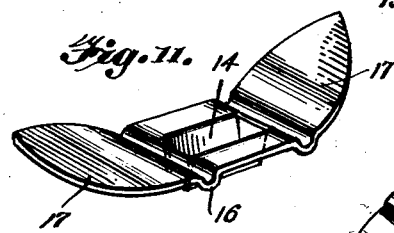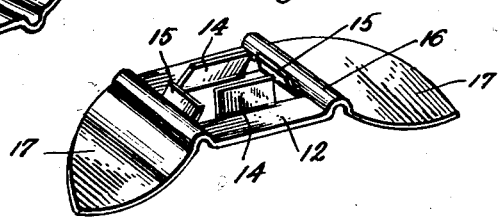

2,377,371

UNITED STATES PATENT OFFICE 2,377,371

DEVICE FOR ELIMINATING WEAR ON BRAKE BEAM HEADS

Allan L. Prentice, Ashtabula, Ohio, assignor of one-half to Joseph L. Ortner, Cincinnati, Ohio Application November 19, 1943, Serial No. 510,956

11 Claims. (Cl. 188—236)

This invention relates to brakes for railway cars and other rolling stock and more particularly to means for eliminating wear on the lower lugs of the brake beam head incident to vibration of the parts when the car is in motion.

The object of the invention is to provide a compensating wear plate which will effectually prevent excessive wear on the lower lugs of new brake beam heads and compensate for wear on said lower lugs when the device is applied to old or worn brake beam heads.

A further object of the invention is to provide a compensating wear plate formed of spring metal having its central portion provided with anchoring means and its opposite ends deflected upwardly to form resilient compensating members adapted to be interposed between the confronting faces of the adjacent lugs of the brake shoe and head respectively.

A further object is to provide the wear plate at the key receiving opening therein with resilient depending side and end lips which fit between the lower lugs of the brake beam head, the end lips serving to guide the brake shoe locking key within said opening and the side lips to yieldably grip the brake shoe locking key and prevent accidental displacement thereof.

A further object is to reinforce and strengthen the wear plate by the provision of transverse ribs disposed on opposite sides of the key receiving opening and adapted to rest on the lower lugs of the brake beam head to permit proper functioning of the resilient compensating members.

A still further object of the invention is generally to improve this class of devices so as to increase their utility, durability and efficiency.

In the drawings:

Figure 1 is a vertical sectional view of a standard brake beam head and shoe showing the improved compensating wear plate in proper position thereon.

Figure 2 is a detail vertical sectional view showing the brake shoe locking key about to enter the opening in the wear plate.

Figure 3 is a transverse sectional view taken on the line 3—3 of Figure 2.

Figure 4 is a vertical sectional view taken on the line 4—4 of Figure 1.

Figure 5 is a transverse sectional view taken on the line 5—5 of Figure 1.

Figure 6 is a detail sectional view taken on the line 6—6 of Figure 4.

Figure 7 is a detail side elevation showing the inclination of the resilient fingers or compensating members with respect to the lugs of the brake beam head to facilitate guiding the lug of the brake shoe to its proper position between the upper and lower lugs of the brake beam head.

Figure 8 is a vertical sectional view, partly in elevation, showing the compensating wear plate applied to a brake beam head, the lower lugs of the head of which have become worn or otherwise damaged from constant use.

Figure 9 is a perspective view of the compensating wear plate detached.

Figure 10 is an inverted perspective view of the wear plate.

Figure 11 is a perspective view illustrating a modified form of wear plate.

The improved compensating wear plate forming the subject matter of the present invention is particularly designed for use on new brake beam heads to prevent or retard wear on the lower supporting lugs thereof and, in Figure 1 of the drawings, is shown applied to a brake beam head and shoe of standard construction and indicated at 5 and 6, respectively. The brake beam head 5 is provided with spaced upper and lower supporting lugs 7 and 8 between which is interposed the supporting lug 9 of the brake shoe 6, the parts being secured in assembled position by means of a brake shoe locking key 10.

In order to prevent excessive vibration between the opposing faces of the supporting lugs of the brake head and shoe, and consequent wear on the lower lugs of said head, I provide a compensating wear plate 11 of the construction shown in Figure 9 of the drawings. The plate 11 is preferably formed of spring metal and comprises an elongated body portion having a flat intermediate portion 12 formed with an opening 13 adapted to receive the brake shoe locking key 10. This opening 13 is preferably formed by cutting the metal transversely of the plate and pressing the metal at opposite sides of said opening downwardly to form depending downwardly converging resilient lips 14 adapted to yieldably engage the adjacent side faces of the locking key 10 and hold said key against vertical displacement, as shown in Fig. 6. These lips 14 extend downwardly through the recess 14' between the lower lugs 8 of the brake beam head, as shown in Fig. 4, and not only serve to hold the locking key 10 against accidental displacement but also serve to center and anchor the compensating wear plate in position. The metal at the end walls of the opening 13 is bent downwardly to form relatively short resilient end lips 15 which act as guides for the brake shoe locking key and serve to direct said locking key within the opening in the wear plate when assembling the brake beam head and shoe. At opposite sides of the flat portion 12 of the wear plate, the metal is pressed or stamped downwardly to form transverse reinforcing ribs 16, and extending laterally from said ribs 16 are upwardly inclined longitudinally bowed resilient compensating members or fingers 17 which fit between the confronting faces of the lugs 8 and 9. The ends of the resilient compensating members or fingers 17 are curved rearwardly, as indicated at 18 in Fig. 9, and when the wear plate is in position on the brake head, the ribs 16 bear against the lugs 8 and form, in effect, fulcrums for the spring fingers. It will here be noted that the compensating members or fingers 17 are inclined upwardly and rearwardly to conform to the inclination of the adjacent faces of the lugs 8, the forward portions of the members 17 being spaced a less distance from the lugs 8 than the rear portions thereof so as to assist in guiding the lug 9 of the brake shoe between the lugs 8 when the parts are assembled, as best shown in Figure 8 of the drawings.

It will also be noted that the upper surface of each resilient member or finger 17 is slightly bowed at 19 for contact with the lug 9, as shown in Fig. 8, and thus permit said fingers to properly function when the brake shoe is subjected to vibration by a car in motion.

When the wear plate is used in connection with new brake beam heads, said plate is positioned on the lower lugs 8 of the brake beam head with the spring lips 14 and 15 extending within the recess between the lugs and with the ribs 16 resting on the upper surface of said lugs, as best shown in Figure 4 of the drawings. Any vibration imparted to the brake head or shoe will be taken up by the resilient members or fingers 17 so that wear which usually occurs on the lower lugs 8 will be effectually prevented.

When the device is used in connection with worn brake beam heads, the wear plate is positioned on the brake head in the manner previously described, with the reinforcing ribs 16 bearing against the worn faces 20 of the lower lugs 8, as best shown in Figure 7 of the drawings.

It will thus be seen that the end lips 15 act as guides for the brake shoe locking key, as shown in Fig. 5 while the side lips 14 serve the dual function of centering and anchoring the wear plate on the supporting lugs of the brake beam head and as a means for holding said brake shoe locking key against accidental displacement, as shown in Fig. 6, and that the resilient compensating members or fingers 17 serve to prevent or retard wear on the lower supporting lugs of said brake beam head by holding the lug 9 out of contact with lugs 8, as shown in Fig. 7.

In Figure 11 of the drawings, there is illustrated a modified form of the invention in which the end lips are dispensed with, the construction and operation of the wear plate being otherwise the same as that shown in Figures 9 and 10.

The device is very simple in construction and can be quickly applied to either new or worn brake beam heads without the necessity of any structural change therein and, when thus applied, will retard and, in many cases, eliminate wear on the lower supporting lugs and consequently materially increase the effective life of the brake head. It will, of course, be understood that the devices may be made in different sizes and shapes and constructed of any suitable material, without departing from the spirit of the invention.

Having thus described the invention, what is claimed is:

1. The combination with a brake beam head and brake shoe having interfitting supporting lugs; of a wear take-up device having oppositely disposed resilient compensating members interposed between the opposing faces of said lugs and curved longitudinally to impart added resiliency to said compensating members.

2. The combination with a brake beam head and brake shoe having interfitting recessed lugs; of a wear take-up device having opposed depending lips fitting in the recess of one of said lugs and provided with oppositely disposed resilient compensating members interposed between the opposing faces of adjacent lugs and for a portion of their lengths spaced from one set of lugs to permit flexing of the compensating members under pressure.

3. The combination with a brake head and shoe having interfitting recessed lugs and provided with a brake shoe locking key extending through the recesses in said lugs; of a wear take-up device having a key receiving slot therein and provided at said slot with opposed depending resilient side and end lips fitting in the recess of the brake beam lug, the end and side lips constituting guides for directing the brake shoe locking key into place and frictionally gripping the key to hold the key in place, said wear take-up device being provided with oppositely disposed resilient compensating members interposed between the opposing faces of the brake beam lug and the brake shoe lug and bowed longitudinally by pressure of the brake shoe lug.

4. The combination with a brake beam head and brake shoe having interfitting recessed lugs and provided with a brake shoe locking key extending through the recesses of said lugs; of a wear take-up device having its intermediate portion formed with a slot, the walls of which are formed with downwardly converging side and end lips fitting in the recess of the brake beam head lug, said lips constituting guides for directing the brake shoe locking key into place and frictionally gripping said locking key to hold the key in place, said take-up device having its opposite end portions inclined upwardly to form resilient compensating members interposed between the opposing faces of the brake beam head lug and the brake shoe lug.

5. The combination with a brake beam head and brake shoe having interfitting recessed lugs and provided with a brake shoe locking key extending through the recesses in said lugs; of a wear take-up device comprising an elongated resilient plate having its intermediate portion provided with a longitudinal slot and downwardly converging lips fitting into the recess of the brake beam head lug and gripping the brake shoe locking key, said plate being provided with transversely disposed reinforcing ribs bearing against the lugs of the brake head and with upwardly inclined longitudinally bowed resilient members extending from the ribs and interposed between the opposing faces of the brake beam head lug and the brake shoe lug.

6. The combination with a brake beam head and a brake shoe having interfitting recessed lugs and provided with a brake shoe locking key extending through the recesses in said lugs; of a wear take-up device having a flat slotted intermediate portion and provided at opposite edges of the slot with downwardly converging resilient lips fitting in the recesses of the lug of the brake beam head and yieldably engaging the brake shoe locking key, said plate being provided on opposite sides of the flat intermediate portion thereof with transversely disposed reinforcing ribs adapted to rest on the lug of the brake beam head, said plate terminating in upwardly inclined resilient members interposed between the opposing faces of the brake beam head and the brake shoe lug.

7. The combination with a brake beam head and a brake shoe having interfitting recessed lugs and provided with a brake shoe locking key extending through the recesses in said lugs; of a compensating wear take-up device having its intermediate portion slotted and provided with depending lips fitting within the recess of the brake beam head lug and certain of which lips yieldably engage the brake shoe locking key to frictionally hold the key in place, said plate being provided with upwardly inclined resilient terminal members interposed between the opposing faces of the brake beam head lug and the brake shoe lug, said members being disposed at an angle to the upper surface of the brake beam head lug to facilitate assembling the brake beam head and the brake shoe.

8. A wear take-up device for brake beam heads comprising an elongated plate having its intermediate portion slotted and provided with downwardly converging spring lips, said plate having its opposite end portions inclined upwardly to form resilient compensating members.

9. A wear take-up device for brake beam heads comprising an elongated plate having a flat intermediate portion formed with a slot adapted to receive a brake shoe locking key and provided at opposite edges of said slot with depending converging lips for yieldable gripping engagement with said brake shoe locking key, the opposite end portions of the plate being deflected upwardly and inclined rearwardly to form resilient compensating members.

10. A wear take-up device for brake beam heads comprising an elongated resilient plate having a flat intermediate portion formed with a longitudinal slot adapted to receive a brake shoe locking key, the material at opposite sides and ends of the slot being bent downwardly to form resilient side lips and end lips for frictional gripping engagement with side faces of said brake shoe locking key, the material at opposite sides of the intermediate flat portion being pressed downwardly to form transversely extending reinforcing ribs constituting fulcrums and thence bent upwardly above the plane of said flat portion to form resilient compensating members.

11. A compensating wear take-up device for brake beam heads comprising a plate formed with an intermediate slot adapted to receive a brake shoe locking key, said plate being provided at said slot with coacting downwardly converging side lips and end lips, the side lips being adapted to yieldably engage the front and rear faces of said locking key and the end lips the opposite side faces of the key and forming guides for said key, said plate having its opposite end portions inclined upwardly and curved longitudinally to form resilient compensating members.

ALLAN L. PRENTICE.